United States Patent [19]

Baldi

[11] Patent Number: 5,361,493
[45] Date of Patent: Nov. 8, 1994

[54] METHOD OF MANUFACTURING WHEELS FOR MOTOR VEHICLES

[75] Inventor: Valter Baldi, Bologna, Italy

[73] Assignee: Reynolds Wheels S.p.A., Zola Predosa, Italy

[21] Appl. No.: 45,577

[22] Filed: Apr. 9, 1993

[30] Foreign Application Priority Data

Jan. 15, 1993 [EP] European Pat. Off. ......... 93830012.6

[51] Int. Cl.$^5$ ............................................. B21K 1/32
[52] U.S. Cl. .......................... 29/894.324; 29/894.32; 301/5.21; 301/95
[58] Field of Search .................. 29/894.32, 894.324; 301/5.1, 5.21, 5.22, 95–97; 152/381.4, 379.5

[56] References Cited

U.S. PATENT DOCUMENTS

| 1,860,216 | 5/1932 | Ash. | |
| 3,808,660 | 5/1974 | Wik | 29/159 R |
| 3,951,563 | 4/1976 | Ravenhall | 29/159.01 |
| 4,246,950 | 1/1981 | Welter | 152/381.4 |
| 4,279,287 | 7/1981 | Daudl | 152/375 |
| 4,502,521 | 3/1985 | Tavazza et al. | 152/379.5 |
| 4,561,275 | 12/1985 | Itou et al. | 72/70 |
| 4,606,390 | 8/1986 | Shute | 152/381.4 |

FOREIGN PATENT DOCUMENTS 2455279 8/1976 Germany.

OTHER PUBLICATIONS

Society of Automotive Engineers "Reduction of Tire Nonuniformities by Machining Techniques", Jan. 11–15, 1971.

Primary Examiner—P. W. Echols
Attorney, Agent, or Firm—Darby & Darby

[57] ABSTRACT

The semifinished casting for an alloy road wheel undergoes three successive machining operations in which material is removed by stages to produce an inner circumferential seating, destined ultimately to accommodate one bead of a tire, a center hole coaxial both with the inner seating and with the axis of rotation of the wheel, also a set of fixing holes of which the axes describe a circle centered on the axis of rotation, and finally, an outer circumferential seating destined to accommodate the remaining bead of the tire, which is offset from the axis of rotation in such a way as to achieve a non-uniform distribution of mass, limited to the part of wheel affording the outer circumferential seating, that varies progressively with the change in angular position around the axis of rotation between a maximum and a minimum value.

1 Claim, 4 Drawing Sheets

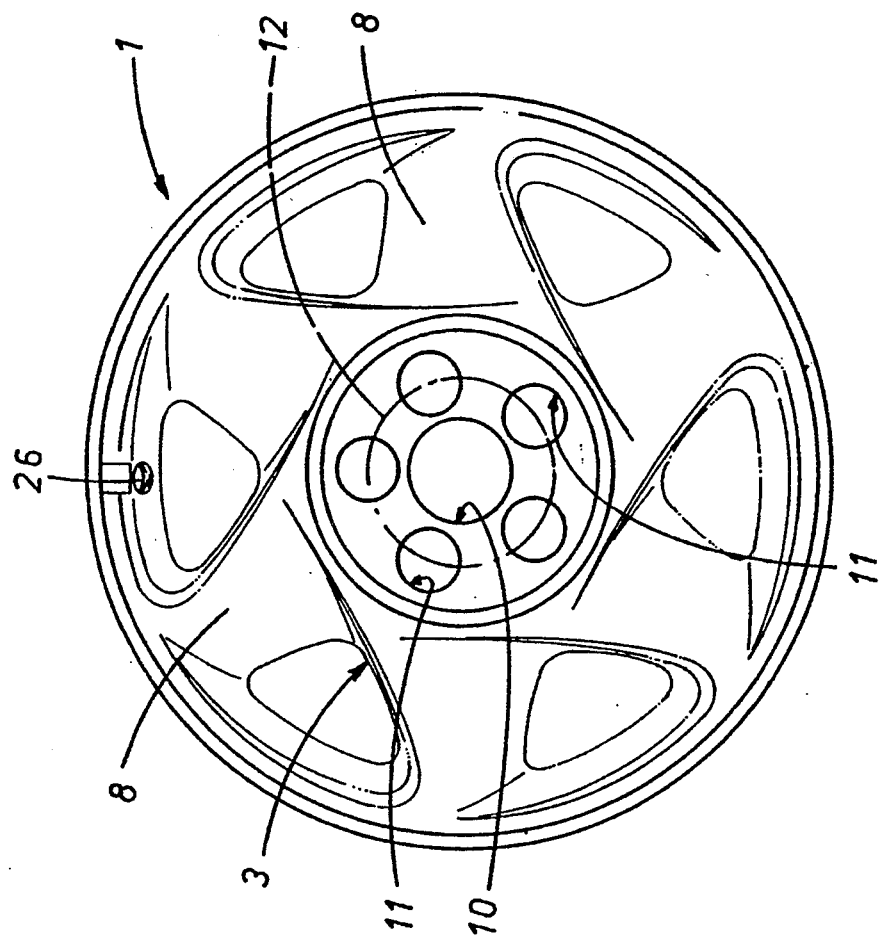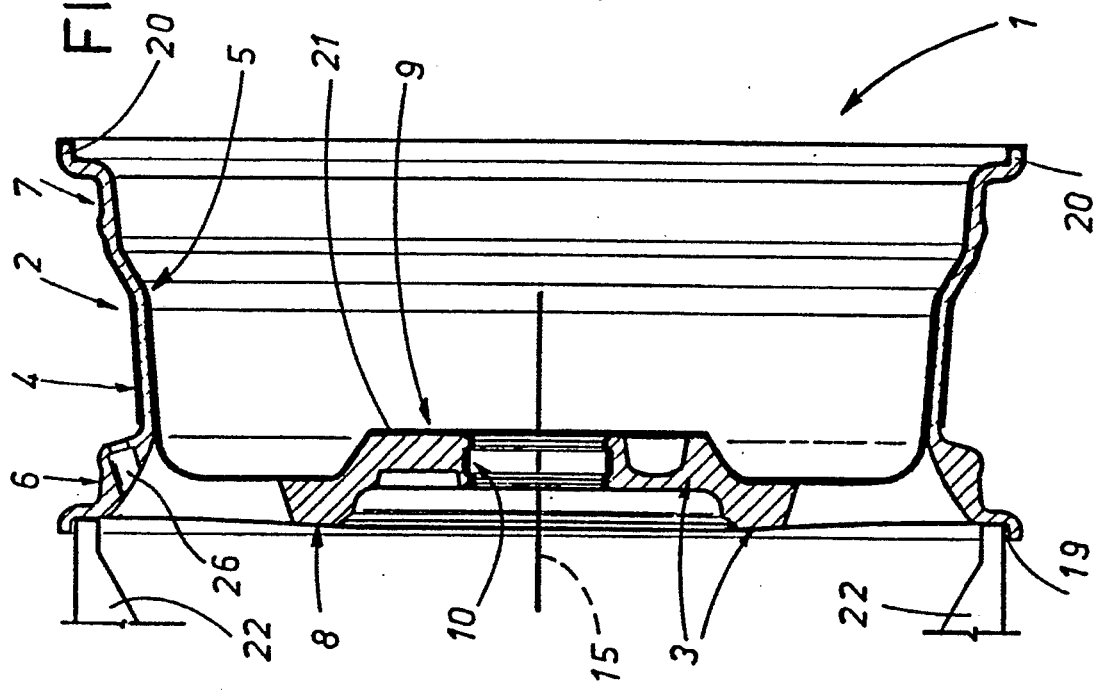

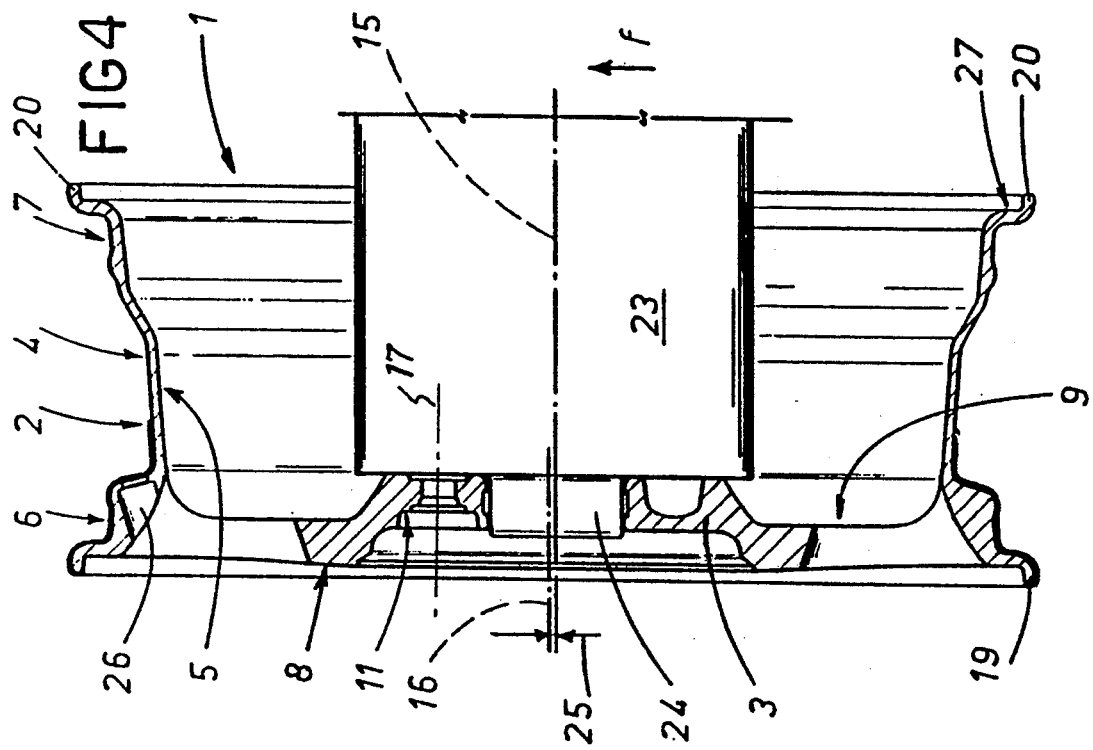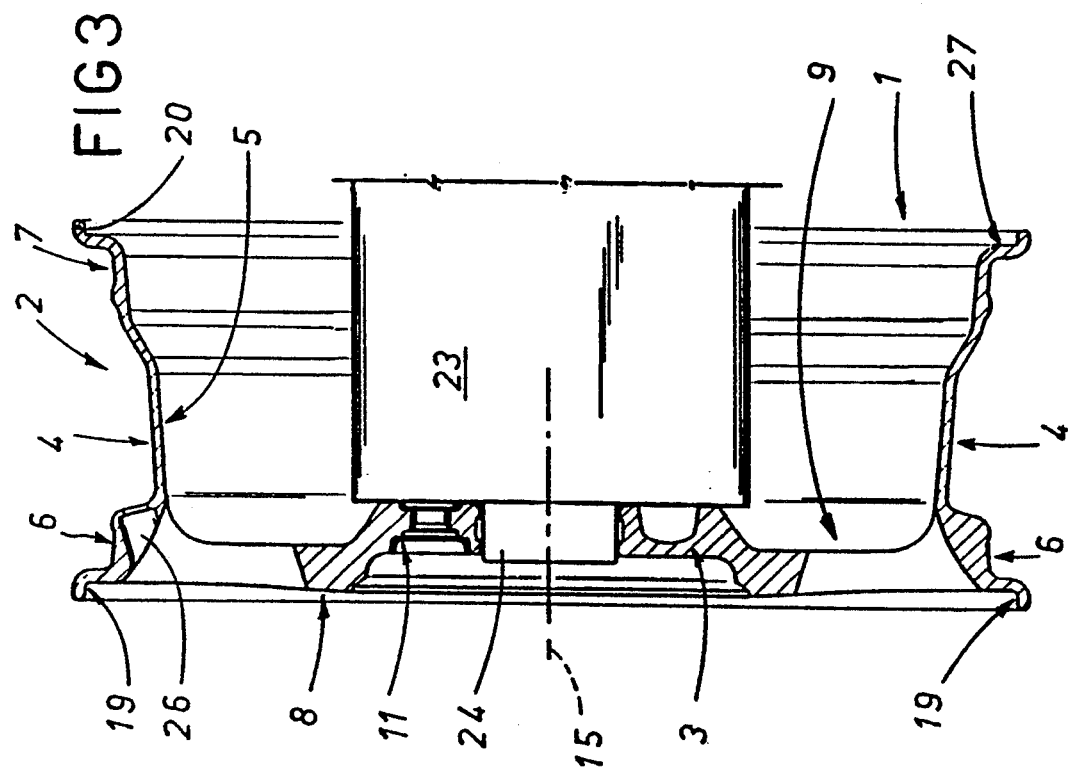

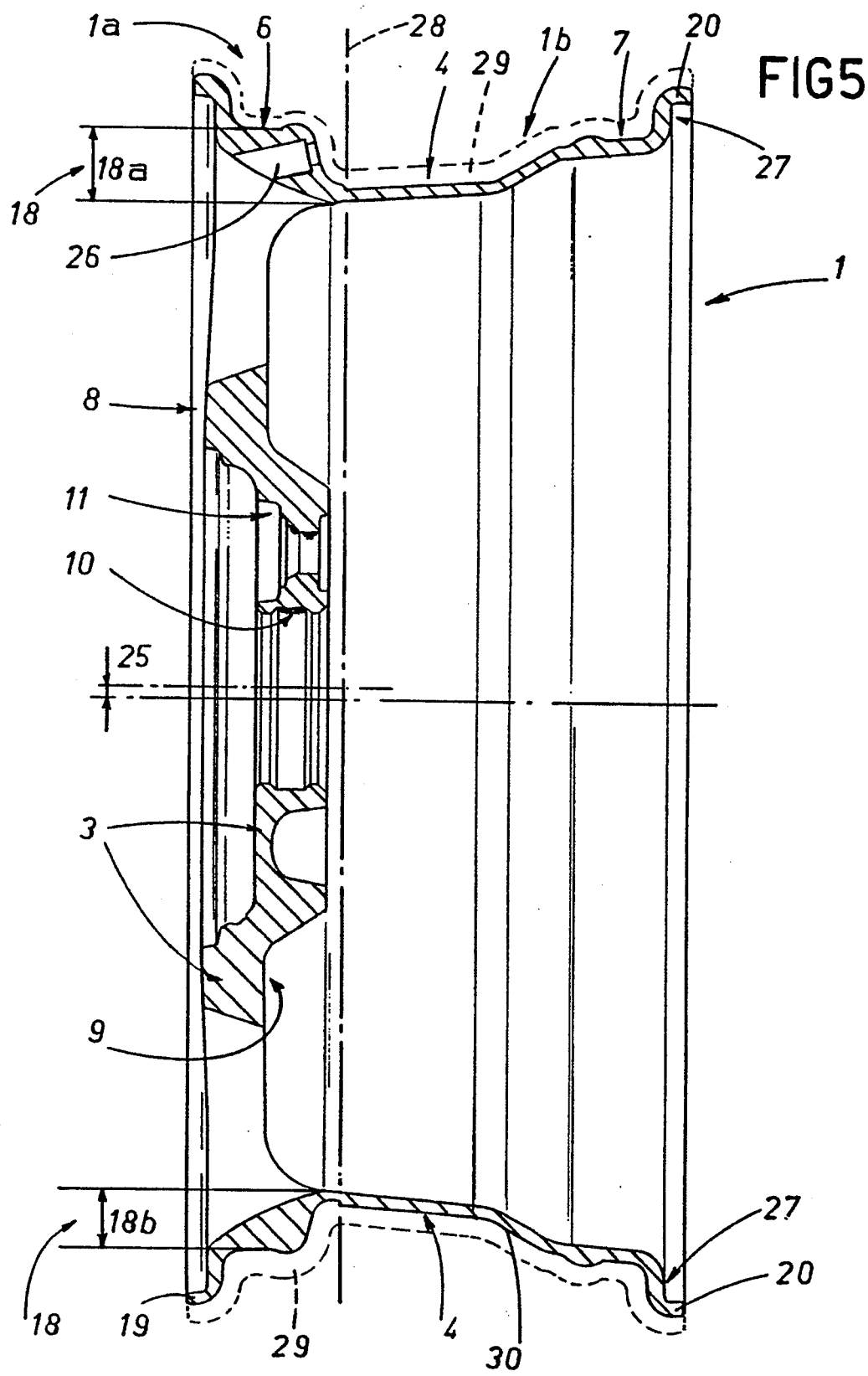

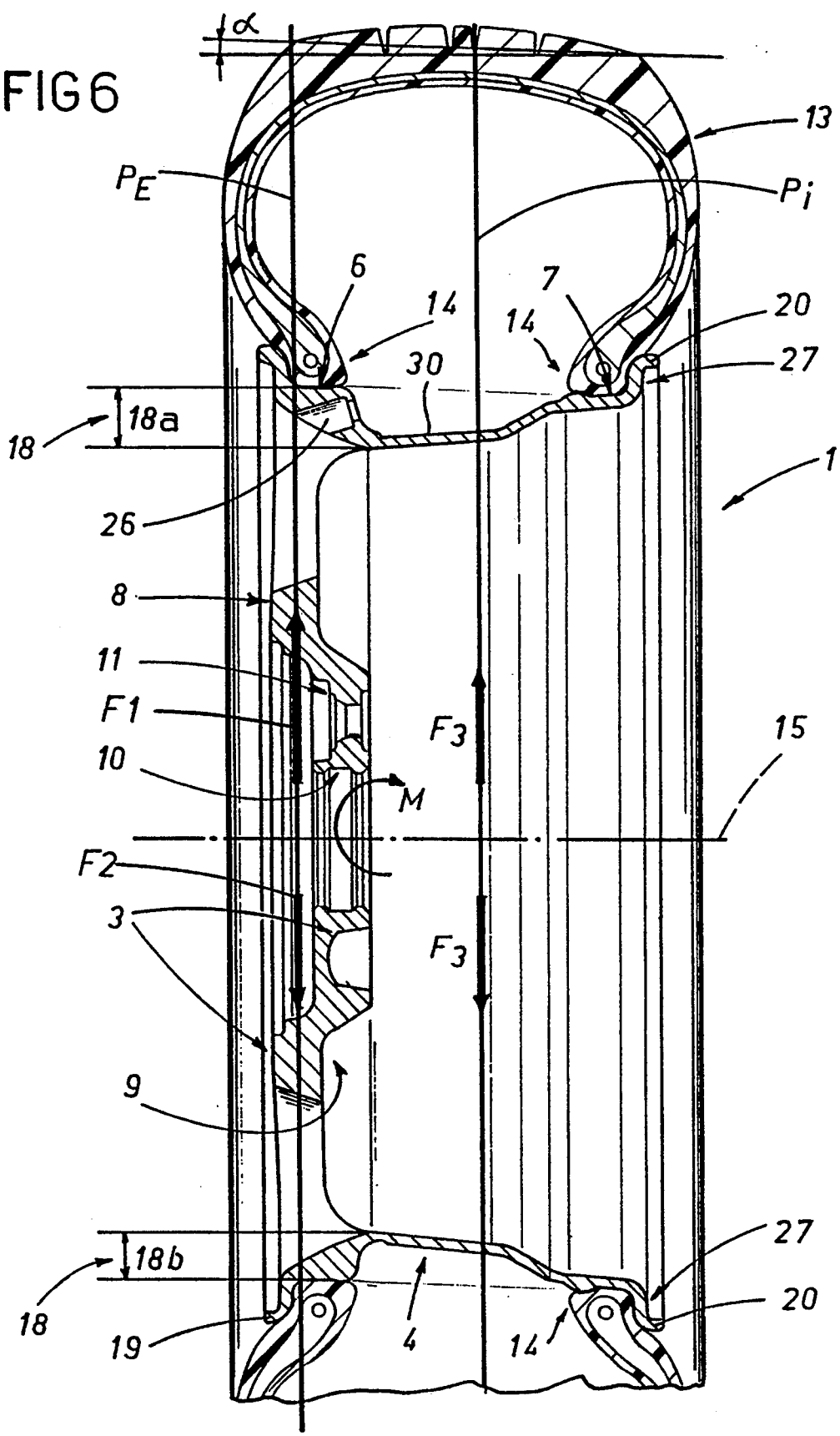

METHOD OF MANUFACTURING WHEELS FOR MOTOR VEHICLES

BACKGROUND OF THE INVENTION

The present invention relates to a method by which to fashion wheels for motor vehicles, in particular cast wheels, and to the wheels obtainable by such a method. More exactly, the invention relates to a method of manufacturing a wheel which when fitted with a pneumatic tire will be capable of ensuring a reduction in the forces of inertia generated by the assembled wheel and tire once set in rotation. It is known that a rigid body such as a mechanical component, when rotated about a fixed axis, becomes invested with centrifugal force and torque. In the specific instance of road wheels, fitted with tires and secured to the relative supporting members of a motor vehicle, the inertial and torque forces generated in rotation give rise to serious functional disturbances; their effect is to trigger rotational reactions in the supporting members, whereupon vibrations are set up and transmitted through the mechanical components to which the selfsame supporting members are mounted. What is more, the vibrations generated in this manner are clearly discernible through the steering system of the vehicle and, at higher road speeds, liable not only to cause discomfort to the driver but also to create difficulties in maintaining direction, with the result that normal road-holding is adversely affected.

The variations in inertial forces generated in this manner can be measured utilizing special equipment designed to give a reading from polar coordinates centered on the axis of rotation. In particular the operator can measure variations in inertial forces referred to the tire, exclusively, and to the wheel exclusively, also to the wheel and tire together. The problem in question has long been recognized, as witnessed by U.S Pat. No. 1,860,216 which explicitly discloses the notion of securing a sleeve to the wheel disc, disposed with its axis offset from the axis of rotation and connected thus to the hub of the vehicle. The effect is to generate a greater weight in one half of the wheel than in the other, the heavier half being that occupied by the valve hole. The degree of offset between the axis of the sleeve and the axis of rotation of the assembled wheel and tire is established by determining the extent to which the selected tire registers out of balance. Thereafter, the unbalanced tire is fitted to the unbalanced wheel in such a manner that each imbalance can compensate the other. In short, the localized masses upsetting the balance respectively of the tire and of the wheel will be disposed on opposite sides of the axis of rotation to the end of achieving a mutual compensation.

Mention is made as early as 11–15$^{th}$ Jan. 1971, in a publication by S.A.E, the American Society of Automotive Engineers, of the concept of reducing, or rather compensating variations in kinetic forces by fitting pneumatic tires to wheels eccentrically. By contrast, the prior art embraces the technique, as stated in the background of U.S Pat. No. 3,808,660 for example, of measuring the variations in inertial forces generated by a tire and removing portions of material (rubber) in the event that such variations exceed a prescribed limit, effecting a series of measurements and successive removals of material. In order to avoid effecting numerous measurements and successive removals of material, while ensuring that a balanced tire will not ultimately form part of an unbalanced wheel-tire assembly, U.S. Pat. No. 3,808,660 discloses the procedure of fitting the tire to the wheel, effecting a measurement as described above and localizing the point at which peak amplitude of the fundamental frequency occurs, then offsetting the center hole from the axis of rotation by an amount commensurate with the peak value measured. The offset and the heavy portion of the tire are located on opposite sides of the axis of rotation in such a way that the one is cancelled out by the other. It will be seen from the drawings of the patent in question that the offset is obtained by the addition of a ring, inserted into the flanged center hole of the wheel disc and fitted over the hub pivot. The bore and the surface of revolution of the ring are offset by a predetermined amount, which is a function of the peak value as measured for the assembled wheel and tire. When mounting the wheel to the hub, the ring can be rotated on the pivot to find the correct angular position of the offset in relation to that of the pivot; in like manner, the ring can be repositioned or replaced in the event that the initial correction should prove inaccurate at a subsequent verification.

Referring again to the prior art, U.S. Pat. No. 3,951,563 addresses the difficulty in achieving a faultless assembly of the disc and rim of a wheel, with the center hole of the disc and the axis of rotation coinciding to best advantage. The method disclosed is one of setting the assembled wheel in rotation about a reference axis, measuring the variations in the radial forces generated during rotation, then locating the center hole in a position, offset from the axis of rotation, at which minimum variation occurs.

Similarly, there are dynamic tests used by motor vehicle manufacturers for measuring the high and/or the low value of the fundamental frequency produced by radial forces of inertia, both in wheels and in tires, and identifying the corresponding angular position. Having run the tests, the tire is fitted to the wheel such that the position identified as 'high' for the one coincides with the position identified as 'low' for the other, a method known as "match mounting" to those skilled in the art. Such a procedure is somewhat lengthy and costly, however, especially when considering that it has to be repeated on each wheel and tire assembled. Given that each motor vehicle has at least four wheels, it requires little imagination to envisage the annual cost of match-mounting wheels and tires for all the vehicles produced in any one year. The ongoing demand for improvement in this field has been met on the one hand by an effort on the part of tire manufacturers to provide increasingly better balanced products, or at least to provide tires bearing an indication of the area of maximum or minimum imbalance, i.e. the position reflecting the high or low value of the fundamental frequency generated in rotation by radial forces of inertia. On the other hand, the makers of wheels have made similar efforts with their products so that discs also bear these same 'high' and 'low' indications. Accordingly, it becomes possible for wheels and tires to be assembled correctly without any dynamic balancing operations being necessary, but simply by positioning the 'high' area of the tire to coincide with the 'low' area of the respective wheel. Given the need to provide wheels with a 'high' or 'low' reference mark as described above, and with the end in view of reducing the offset between the center hole and the circle described by the axes of the stud holes, by way of which the disc is secured to the hub of a vehicle, U.S Pat. No. 4,279,287 discloses a method of locating the 'high' or 'low' reference at a predetermined angular position of the wheel, in this instance a pressed steel disc. This patent method envisages the preparation of a rim and disc assembly, the disc being inserted into and welded to the rim, of which the disc affords at least one center hole disposed offset from the axes of the circumferential seatings destined to receive the beads of the tire. In practical terms the procedure is one of punching the center hole and the stud holes in a single operation, and in such a way that the axis of the former is concentric with the axis of the circle described by the latter, but offset in relation to the axis of the disc-rim assembly overall. The axis of rotation of the wheel is thus displaced by translation away from the axes of both circumferential seatings, and the imbalance built into the wheel is a static imbalance.

Examining these references in detail, it is clear that all relate to the pressed steel disc type of wheel, and therefore to a production technique that is relatively imprecise, not least by reason of the dimensions typically involved.

In every instance, moreover, it emerges that the preferred method pursued is one of offsetting the center hole and the circle of stud holes from the circumferential seatings destined to accommodate the tire beads, which obviously are coaxial, such that the eccentricity of the axis of rotation is taken up by the elasticity of the pneumatic tire; needless to say, considerable vibration would be transmitted to the vehicle as a result of any such eccentricity if the tire were rigid.

The object of the present invention is to afford a method of fashioning alloy wheels, of the type cast in molds and then machined to remove an allowance of material, whereby an "imbalance" is incorporated of which the effect, in each wheel fitted with a respective pneumatic tire and secured to the hub of a motor vehicle, is to achieve an improved overall balance both of the assembled wheel and tire and in the moving mechanical parts of the vehicle with which the wheel is associated.

A further object of the invention is to produce alloy wheels with a deliberate imbalance by employing machine tools of conventional design rather than the special toolage currently required as in the case, for example, of the patent methods referred to above.

SUMMARY OF THE INVENTION

The stated objects are realized in a method of fashioning wheels for motor vehicles according to the invention, in particular, wheels obtainable by casting, of which the recognizable components are a rim, exhibiting an external surface of revolution and an internal surface of revolution, of which the external surface of revolution affords a pair of circumferential seatings, outer and inner, destined to accommodate the beads of a relative pneumatic tire, and a disc, exhibiting an external face and an internal face and affording at least one center hole.

In the method disclosed, each casting undergoes a first machining operation to remove material at least from the inner circumferential seating, the internal surface of revolution, the internal face and the center hole, effected in relation to a single reference axis coinciding with the axis of rotation of the wheel, a second machining operation in which material is removed to create holes for securing the wheel, effected so that the axes of the holes describe a circle concentric with the reference axis of the first machining operation, and a third machining operation to remove material at least from the outer circumferential seating, which serves to define a surface of revolution centered on an axis of rotation offset from the reference axis of the first and second machining operations; in this way, the distribution of mass around the part of the wheel affording the outer circumferential seating varies progressively in relation to the reference axis of the first and second machining operations, between a minimum and a maximum value.

The same stated objects are realized in a wheel for motor vehicles, obtainable by casting and finished by implementation of the steps outlined above. Similarly, the recognizable components of such a wheel are a rim, exhibiting an external surface of revolution and an internal surface of revolution, of which the external surface of revolution affords an outer circumferential seating and an inner circumferential seating destined to accommodate the beads of a pneumatic tire, and a disc, exhibiting an external face and an internal face and affording at least one center hole surrounded by a set of stud holes in a circular formation. In the wheel according to the invention, the inner circumferential seating and the internal surface of revolution are defined by surfaces of revolution concentric with the axis of the center hole whereas the outer circumferential seating is defined by a surface of revolution centered on an axis offset from the axis of the center hole, with the result that the depth of material and therefore the distribution of mass around the part of the wheel affording the outer circumferential seating varies progressively in relation to the axis of the center hole between a minimum and a maximum value.

BRIEF DESCRIPTION OF THE DRAWINGS

The invention will now be described in detail, by way of example, with the aid of the accompanying drawings, in which:

FIG. 1 shows a frontal elevation of the wheel according to the present invention;

FIGS. 2, 3 and 4 are axial sections illustrating the three machining operations which form part of the method according to the present invention;

FIG. 5 shows an axial section through the wheel of FIG. 1, in which certain dimensions are purposely exaggerated to illustrate how the distribution of mass around a part of the wheel, limited to the outer circumferential seating, varies progressively between a minimum and a maximum value in relation to the axis of rotation of the wheel;

FIG. 6 shows the wheel of FIG. 5, in smaller scale, fitted with a pneumatic tire.

DESCRIPTION OF THE PREFERRED EMBODIMENTS

With reference to the accompanying drawings, the invention relates to a method of fashioning wheels, and in particular, road wheels 1 cast in a metal alloy. Two elements are recognizable in a wheel 1 of the type in question, substantially distinct in appearance but incorporated in a single monolithic structure precisely by reason of the fact that the wheel is a casting. The two elements are a rim 2 and a disc 3.

The rim 2 is annular in shape and exhibits an external surface of revolution 4 and an internal surface of revolution 5. The position of the disc 3 in relation to the rim 2 is such that the elements assume a bell-like aspect, in respect of which the disc 3 presents an external face 8 and an internal face 9; the disc also exhibits at least one center hole 10.

The external surface of revolution 4 of the rim 2 affords an outer circumferential seating 6 and an inner circumferential seating 7, which are destined to accommodate the beads 14 of a pneumatic tire 13 (see FIG. 6).

According to the method disclosed, each wheel 1 undergoes a first machining operation to remove material at least from the inner circumferential seating 7, the internal surface of revolution 5, the internal face 9 and the center hole 10; the machining cuts are effected in relation to a single reference axis 15 which coincides with the axis of rotation of the wheel 1, as shown in FIG. 2. There then follows a second machining operation whereby material is removed to create stud holes 11 in the wheel 1, located such that their axes 17 (See FIG. 4) define a fixing circle 12 centered on the reference axis 15 of the first machining operation as shown in FIG. 3. Finally, the method comprises a third machining operation in which material is removed at least from the outer circumferential seating 6 to establish a surface of revolution centered on an axis 16 displaced from the reference axis 15 adopted for the first and the second machining operations, as illustrated in FIG. 4. In this way, the distribution of mass around the portion of the wheel 1 that incorporates the outer circumferential seating 6 is rendered non-uniform, characterized by gradual and infinite variation between a minimum value and a maximum value, as measured in relation to the reference axis 15 of the first and second machining operations.

Observing FIGS. 2, 3 and 4, in which the surfaces machined respectively during the first, second and third operations are shown in bold lines, it will be seen that the wheel 1 affords an outer flange 19 and an inner flange 20 projecting frontally from the opposite extremities of the rim. Prior to the first machining operation, and while still in the as-cast condition, the wheel 1 is aligned by means of a first centralizer 22 offered to the inside surface of the outer flange 19; the first machining operation then comprises the step of producing a reference surface 21 on the internal face 9 of the disc 3, destined ultimately to be breasted with and clamped against a corresponding surface afforded by the hub (not illustrated) of a motor vehicle. Before the second machining operation, the wheel 1 is aligned coaxially around its own center hole 10 by means of a second centralizer 23 of which the shank 24 is inserted through the hole 10 and the face offered to the reference surface 21 afforded by the disc; the operation might equally well be effected by securing the wheel 1 around the inner flange 20, for example using a plurality of teeth (not illustrated), and a centralizer 23 of which the face is offered to the annular surface 27 of the flange 20. In any event, the centralizer 23 will be disposed faultlessly coaxial with the axis of rotation of the machine tool and, given that the center hole 10 and the reference surface 21 and/or the annular surface 27 were obtained coaxially by a previous machining operation, the second operation will necessarily be executed in coaxial alignment with the first. Accordingly, the stud holes 11 are distributed around a fixing circle 12 coaxial with the center hole 10. Prior to the third machining operation, finally, the same second centralizer 23 is displaced marginally through a path parallel with its own axis in the direction of the arrow f. This displacement is illustrated in FIG. 4 by the two axes denoted 15 and 16, the former being the reference axis for the first and second machining operations, which coincides with the two axes of the first and second centralizers 22 and 23 when aligned, the latter providing the reference axis for the third machining operation, which coincides with the axis of the second centralizer 23 when offset by a distance denoted 25 from the position occupied during the second machining operation. In the finished wheel 1, accordingly, the outer circumferential seating 6 is not coaxial with the inner circumferential seating 7, neither with the center hole 10, nor with the fixing circle 12, nor with the external and internal faces 8 and 9 of the disc 3.

As a result of this calculated misalignment, one has a non-uniform distribution of mass in relation to the reference axis 15 which is limited to the part of the rim affording the outer circumferential seating 6, the reference axis 15 being one and the same as the axis of the center hole 10, and thus coinciding with the axis of rotation of the wheel. FIG. 5 shows a section through the wheel 1 in which certain dimensions are intentionally exaggerated to illustrate the thickness or depth 18 of the part of the rim 2 affording the outer circumferential seating 6, at the maximum value 18a and at the minimum value 18b. As discernible from FIGS. 5 and 6, and as intimated above, this same depth 18 reflects the difference that separates the surfaces afforded respectively by the outer circumferential seating 6 and by the internal surface of revolution 5, the latter being coaxial with the axis of rotation 15. For further clarity, a phantom line 29 is added in FIG. 5 to indicate the external profile of the wheel 1 in its as-cast condition, that is, prior to the first and third machining operations which involve removal of the material compassed between the phantom line 29 and the finished profile 30 of the wheel 1. Whilst in reality the variation in depth 18 is minimal, the non-uniform distribution of mass around the rim, as measured from the reference axis 15 (which coincides with the axis of rotation of the rim, it will be recalled), is sufficient to generate both static and dynamic imbalances in the wheel 1. The causes of such imbalances are illustrated by FIG. 6, in which the wheel 1 is shown fitted with a pneumatic tire 13. Also indicated are two planes Pe and Pi, disposed perpendicular to the reference axis 15 and passing through the anticipated centers of mass of the two zones of the wheel subjected to the first and third machining operations. In other words, Pe is the anticipated center of mass of disc 3 and Pi is the anticipated center of mass of rim 2 after the machining steps. Observing FIG. 5, in effect, it will be seen that the machined wheel 1 is characterized by two distinct portions with different centers of mass, which are separated by the phantom line denoted 28 and indicated as 1a, to the left of the line 28, and 1b, to the right. As already intimated, the portion 1a affording the outer circumferential seating 6 is out of balance with the rest of the wheel; thus, the center of mass of this same portion 1a occupies a position different to that of the remainder of the wheel, hence different to that of the portion denoted 1b. In effect, therefore, only the one portion 1a of the wheel 1 remains out of balance with the axis of reference and of rotation 15. It is in the notional planes Pe and Pi that centrifugal forces F1, F2 and F3 are generated when the wheel 1 is set in motion about its axis of rotation 15: in the one plane Pi, which is the nearer to the inner circumferential seating 7 and therefore to the portion of the wheel in which the distribution of mass around the axis of rotation 15 is uniform, the forces F3 are equal and opposite, whereas in the other plane Pe, which coincides with the outer circumferential seating 6, the opposing forces F1 and F2 are of dissimilar intensity; more exactly, the force denoted F1 is of greater intensity than that denoted F2 by reason of the fact that the rim depth 18 in the corresponding halves of the wheel is respectively at its maximum value 18a and its minimum value 18b. The difference in intensity of these forces F1 and F2 results in a static imbalance, first, and a dynamic imbalance thereafter. The dynamic imbalance is due to the center of mass in the corresponding plane Pe being offset from that of the wheel 1 as a whole, such that the resultant of the relative forces F1 and F2 occurs at a given distance from the center of mass of the wheel (not indicated), generating a moment M that tends to deflect the axis of rotation 15.

The distribution of mass around the part of the wheel affording the outer circumferential seating 6 will be determined by the degree of imbalance it is wished to build into the wheel 1 when fitted with a tire 13. The imbalance itself, needless to say, is determined by the measure of the offset 25 between the outer circumferential seating 6 and the remainder of the wheel.

With a wheel 1 purposely "unbalanced" in this way, it becomes possible for an assembled wheel and tire and the moving mechanical parts with which these are associated, to be "balanced" both statically and dynamically. If, in any event, the wheel 1 is fitted with a type of tire 13 other than originally envisaged, the operation of balancing the assembled wheel and tire is markedly simple both in principle and in implementation, as any resulting imbalance can be corrected at the external face of the wheel. The practice currently exists, in fact, especially in Europe, of balancing assembled wheels and tires already fitted to the respective hubs of the motor vehicle, with the precise end in view of simulating normal conditions of operation, one factor in which are the dynamic imbalances generated by associated moving mechanical parts; these imbalances can thus be corrected by applying weights of appropriate value to the external face of the wheel 1, whereas an imbalance incorporated into the internal face of the wheel would obviously disallow correction by this method.

As to the identification of an area relative to the reference axis 15 at which the localization of mass will be greatest, the option exists of shifting the centralizer 23 from the axis 15 in the direction of a hole 26 passing through both the rim 2 and the disc 3, destined ultimately to receive the valve of the pneumatic tire 13. The valve hole 26 is pierced during the second machining operation, and can therefore be utilized as a reference both for the third machining operation and for the purposes of fitting the tire 13. No mention is made of the valve hole 26 in the foregoing description of the method according to the invention, since it has no material role in the machining operations which determine the non-uniform distribution of mass.

To reiterate the features of the wheel 1 according to the present invention, the axis of rotation remains one and the same as the reference axis 15 adopted for machining purposes, coaxial with the wheel 1 as a whole, and the distribution of mass around the part of the wheel affording the outer circumferential seating 6 varies progressively between a minimum value and a maximum value. In other words, the thickness of depth 18 of the rim 2 in the area of the outer circumferential seating 6, varies uniformly from a predetermined minimum value 18b to a predetermined maximum value 18a in dependence on the offset distance 25 between the reference axis 15 and the axis of rotation 16 for the third machining step. With a tire 13 fitted to the wheel 1, its beads 14 located in the outer and inner circumferential seatings 6 and 7, the offset 25 will be taken up by continual deformation within the outer wall of the tire only, i.e. the part of the tire associated with the outer circumferential seating 6; the wall associated with the inner circumferential seating 7, by contrast, will rotate free of any deformation attributable to the geometry of the wheel. The feature in question is illustrated in FIG. 6, where $\alpha$ denotes the angle of deformation induced in the tire 13 once fitted to the wheel 1, and where it will be seen that the left hand bead 14, as viewed in FIG. 6, is displaced in relation to the right hand bead; more exactly, the left hand bead is distanced from the reference axis 15 at the area of maximum depth 18a afforded by the rim and the outer circumferential seating 6, and positioned nearer to the axis 15 at a point diametrically opposite, coinciding with the area of minimum depth 18b.

Thus, given that tires emerge from manufacture with static and dynamic imbalances, the advantages of the present invention derive from the fact that, by providing a wheel proportioned in such a way as to generate both static and dynamic imbalances when set in rotation, it becomes possible to obtain a wheel and tire assembly in which the corresponding imbalances, static and dynamic, tend to compensate one another and cancel out.

The facility of obtaining a faultless static and dynamic balance is made possible by the nature of the machining operations envisaged in the method according to the invention; it will be recalled in fact that these are precision machining procedures performed with conventional toolage and therefore involving no additional costs.

What is claimed is:

1. A method of producing wheels for motor vehicles, comprising the steps of;
    producing a semifinished wheel casting of which the recognizable components are a rim, having an external surface of revolution and an internal surface of revolution of which the external surface of revolution includes an outer circumferential seating and an inner cirumferential seating to accommodate the beads of a pneumatic tire, and a disc, having an external face and an internal face and including at least one center hole;
    performing a first machining operation to remove material at least from the inner circumferential seating, from the internal surface of revolution, from the internal face and from the center hole, effected in relation to a single reference axis coinciding with the axis of rotation of the wheel;
    performing a second machining operation in which material is removed to create holes for securing the wheel, effected in such a way that the axes of the holes define a circle concentric with the reference axis of the first machining operation;
    performing a third machining operation to remove material at least from the outer circumferential seating in such a way as to define a surface of revolution centered on an axis of rotation offset from the reference axis of the first and second machining operations, with the result that the thickness around the part of the wheel including the outer circumferential seating varies from a predetermined minimum value to a predetermined maximum value in dependence on an offset distance between the reference axis and the axis of rotation for the third machining step.

* * * * *